United States Patent Office 3,632,637
Patented Jan. 4, 1972

3,632,637
HYDROXYARYL-CONTAINING AMINOCAR-
BOXYLIC CHELATING AGENTS
Arthur E. Martell, 1211 Orr St.,
College Station, Tex. 77840
No Drawing. Filed Feb. 13, 1968, Ser. No. 705,005
Int. Cl. C07c *101/72;* C07l *15/02, 7/22*
U.S. Cl. 260—519    1 Claim

ABSTRACT OF THE DISCLOSURE

Compounds corresponding to the following formula:

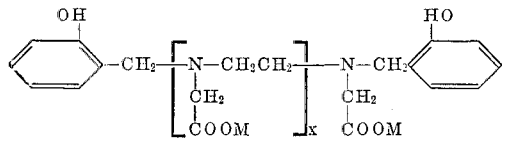

where
x=0, 1, 2
M=H+, Na+, K+, NH₄+ in synthesized from an ortho hydroxy benzyl halide and an amino acetic acid compound.

---

This invention relates to the synthesis of a group of aminoacetate chelating agents containing auxiliary hydroxybenzyl groups, and their application to the formation of exceptionally stable metal chelate compounds.

Synthetic chelating agents, such as ethylenediaminetetraacetic acid (EDTA) are well known, and are widely used to form metal chelate compounds in aqueous solution. There are many metal ions, however, for which EDTA and analogous compounds are not effective chelating agents. Thus EDTA forms unstable chelates of iron (III), bismuth(III), thorium(IV), uranium(IV), and zirconium(IV) in aqueous solution. At various moderate pH values, ranging from 6–8, the EDTA chelates of these metal ions begin to hydrolyze (as well as polymerize), and undergo various undesirable reactions. These chelates further hydrolyze and eventually precipitate when their partially-hydrolyzed solutions are subjected to (1) elevated temperature, (2) an increase in pH, or (3) even simple standing for an extended period of time.

When the structures of aminopolyacetic acids are modified through the replacement of one or more acetic acid groups by an orthohydroxybenzyl group, the resulting compounds have very high affinities for trivalent metal ions such as Fe(III) and Bi(III), and for tetravalent metal ions such as Th(IV) and U(IV). These new agents form stable chelates of the metal ions in solution, that do not precipitate or undergo side reactions when the pH values of their solutions are raised to the maximum value attainable, and even when the temperatures of these alkaline solutions are raised to the boiling point.

Chelating agents meeting the requirements of the compounds described in this invention may be defined by the general formula:

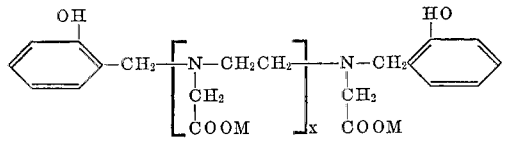

where
x=0, 1, 2 and M is independently selected from the group consisting of H, Na, K, NH₄.

When x=0, R=H, and M is Na, the sodium di(o-hydroxybenzyl)-glycinate combines with iron (III) to form a very stable wine-red iron chelate, which has a stability constant of over $10^{20}$, as defined by the following reaction:

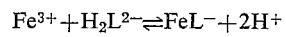

where H₃L is the chelating agent with M=H, R=H, and x=0, and where the monosodium salt has the formula NaH₂L.

When x=1, M is Na, and R=H, the chelating ligand is defined as Na₂H₂L, where the H's represent the displaceable protons of the two phenolic groups. In the absence of a chelated metal ion, these two protons do not dissociate in solution until an extremely high pH is attained (pH 12–13). In the presence of the Fe³⁺ ion, however, these two phenolic groups become displaced by the ferric ion, and a wine-red metal chelate is formed in very acidic solution:

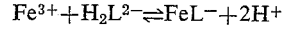

This iron chelate is extremely stable, as discussed in my previous paper (L'Eplattenier and A. E. Martell, J. Am. Chem. Soc., 89, 837 (1967) ). In fact this is the most stable iron (III) chelate for which a precise stability constant has been published in the literature. The stability constant is given in terms of the following reaction:

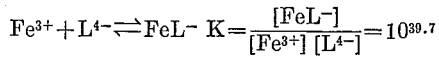

The resulting compound is very stable and quite inert in aqueous solution.

While it is found that maximum stability of Fe (III) and Bi(III) chelates is attained in this new series of chelating agents when x=1, this is not true of the chelates of Th(IV) and U(IV). The chelates formed by these metal ions with N,N'-bis(o-hydroxybenzyl)-N,N-ethylenediaminediacetic acid (x=1), though very stable, still have some tendency to hydrolyze and combine with additional ligands in aqueous solution. However, the next member of the series (x=2) does form very stable, inert chelates with these tetravalent metal ions. This ligand, which may be named N,N" - bis(o - hydroxybenzyl)-N,N',N"-diethylenetriaminetriacetic acid, H₅L (or as the trisodium salt Na₃H₂L) forms extremely stable chelates of metal ions of +4 charge in solution. The reaction with Th⁴⁺ ion may be represented by the following reaction:

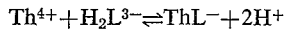

It is not possible to measure the stability constant of the metal chelate ThL⁻ by potentiometric methods because of its very high value. It is estimated that the stability constant of the chelate ThL⁻ is probably greater than $10^{30}$.

A search of the literature has revealed that only one compound been reported in the literature which bears any similarity to the chelating agents of this invention. That compound, N,N' - ethylenebis - [2-o-hydroxyphenyl]glycine, labelled EHPG, is however, much inferior to the analogous compound of this invention in which x=1, M=H, and R=H. The structure of EHPG is:

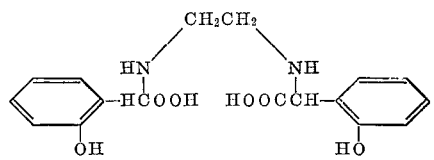

This compound has been described in the literature by Frost et al. (A.E. Frost, H. H. Freedman, S. J. Westerback, and A. E. Martell, J. Am. Chem. Soc., 80, 530 (1958)), and by Anderegg and L'Eplattenier (G. Anderegg and F. L'Eplattenier, Helv. Chim. Acta, 47, 1067 (1964)). These studies, together with the recent study of the Fe(III) chelate of the diamino ligand of the present ligand (HBED) indicates that the stability of the Fe(III) chelate of the latter is 500,000 times more stable than the former.

There have been many attempts to synthesize the chelating agents of the present invention, but none of them have met with success. Thus F. C. Bersworth (U.S. Pat. 2,624,760 (1953)) attempted to substitute the hydroxybenzyl group on ethylenediamine of other polyamines by condensation of the amine (1) with an o-hydroxybenzyl halide, and (2) by Schiff base formation with o-hydroxybenzaldehyde followed by reduction. However, only substituted oxazoles are obtained by these procedures, and none of the o-hydroxybenzyl substituted amines are ever obtained. Thus the final products reported by Bersworth to be obtained by carboxymethylation of the substituted amines were not the o-hydroxybenzyl derivatives of aminocarboxylic acids claimed in Pat. No. 2,624,760. The final products could only have been mixtures without any specific affinity for the ferric ion, or other metal ions. Attempts by this investigator, and by others, to obtain the o-hydroxybenzyl(amino) acid derivatives by the method of U.S. Pat. No. 2,624,760 have failed repeatedly. No chelating agents have ever been obtained by the process described.

One of the important discoveries of the present invention is the finding of a new, high-yield synthetic route to these new and unusual chelating agents. Essentially, the method consists of (1) shielding the phenolic group so that it will not undergo undesirable side reactions during the condensation with the amine, and (2) substituting the acetic acid groups desired on the amine prior to substitution of the o-hydroxybenzyl group. A schematic synthesis of N,N' - bis(o-hydroxybenzyl)-N,N'-ethylenediaminediacetic acid would be:

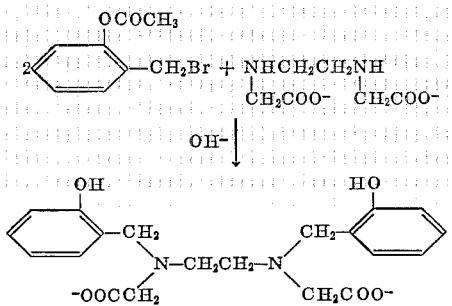

This precedure may be applied to any amino acid with one or more displaceable amino protons. Thus one mole of glycine will react in neutral or alkaline aqueous solution with 2 moles of o-acetoxybenzyl chloride to give, after hydrolysis, N,N - bis(o-hydroxybenzyl)glycine in excellent yield. Similarly, N,N' - bis(o-hydroxybenzyl)-N,N',N''-diethylenetriaminetriacetic acid by reaction of one mole of N,N'N'' - diethylenetriaminetriacetic acid with two moles of o-acetoxybenzyl bromide.

The acid compounds of this invention, and the corresponding alkali metal and ammonium salts, are extremely useful for the formation of stable metal chelates of trivalent and tetravalent metal ions. The importance of these new compounds is due to the fact that the stabilities of the chelates with trivalent metal ions, such as Fe(III) and Bi(III) ions, and with tetravelent metal ions, such as those of Th(IV), U(IV), and Zr(IV, and Sn(IV) are very much more stable than the corresponding chelates of EDTA, EHPG, and of other well-known, commercially-available chelating agents such as nitrilotriacetic acid (NTA), N-hydroxyethyl,N,N',N''-ethylenediaminetriacetic acid (HEDTA), diethylenetriaminepentaacetic acid (DTPA), N,N,N',N' - transdiaminocyclohexanetetraacetic acid (CDTA), N-hydroxyethyliminodiacetic acid (HIMDA), gluconic acid, citric acid, salicylic acid, 3,5 - disulfopyrocatechol (Tiron), and many others. In fact the chelating agents of this invention form more stable chelates with the metal ions noted above than do any other known compounds.

In accordance with the high stabilities of the chelates formed, the chelating agents of this invention may be used for many purposes for which the formation of usually stable chelates of tri- and tetravalent metal ions is required. Thus the formation of inert Fe(III) chelates makes all of these ligands, and especially HBED, an effective chelating agent for removing trace quantities of the ferric ion from solutions and from various types of products. In this process the ferric ion is not really removed, but is converted to an extremely low level of activity by conversion to the inert HBED chelate, which remains in the solution or product under consideration. By this sequestering action all the harmful effects of traces of ferric ions are removed. These effects include the formation of precipitates with various reagents that might be present or may be introduced into the solution, and the catalysis (by $Fe^{3+}$) of the oxidation of many types of natural products, including sugars, amino acids, vitamins, foods and flavors. The catalyst effects of $Fe^{3+}$ in the oxidation of various materials such as natural fibers and plastics are also prevented.

One of the important problems in plant nutrition is to supply a form of iron to plants growing in alkaline soils that will not precipitate or undergo ion-exchange with the cation exchange components (i.g. silicates) of the soil. Up to the present time the only iron carrier that is at all effective in alkaline (calcareous) soils is EHPG, which is relatively expensive. Tests by this investigator of the Fe(III) chelate of HBED, alongside similar tests on the Fe(III) chelate of EHPG, show the former to be much superior, removing alkali-induced chlorosis in young citrous plants much more rapidly, and requiring a smaller amount of chelate to accomplish the same effect.

Similar effects are obtained with compounds of tetravalent metal ions, which are often oxidation or hydrolytic catalysts, or are frequently undesirable in solutions because of their tendency to precipitate. These effects are entirely removed by the chelating agents of this invention containing two or three nitrogen atoms in the ligand molecule (the mono amino compound is also useful for this purpose but is somewhat less effective than the others for the tetravalent metal ion.)

There are many other uses of the chelating agents of this invention based on the unusually high stabilities of their metal chelates formed from tri- and tetravalent metal ions. Thus the monosodium salt of N,N-bis(o-hydroxybenzyl)glycine may be used as an effective titrating agent for the $Cu^{2+}$ ion, and for other divalent metal ions such as $VO^{2+}$ and $Ni^{2+}$. Similarly HBED, as the disodium salt, is an excellent reagent for the titration of $Fe^{3+}$ salts, and $Bi^{3+}$ salts, giving sharp end points. The formation of the chelate goes all the way to completion even in extremely dilute solutions. It is also an excellent colorimetric reagent for detecting traces of iron in solution. It may be mixed with natural materials of all kinds (usually as the sodium salts) for aqueous extraction and analysis of traces of iron.

The synthesis and properties of the chelating agents of this invention are indicated by the following examples:

EXAMPLE I

N,N'-bis(o-hydroxyethyl)-N,N'-ethylenediaminediacetic acid dihydrochloride

In a 1000 ml. Erlenmeyer flask a solution of 62.0 g. of saliginen (o-hydroxybenzyl alcohol) in 100 ml. of pyridine was prepared. To this solution 120 ml. of acetic anhydride was added rapidly with stirring. The temperature rose to 110° spontaneously, and the solution was then boiled for about five minutes. It was then cooled and poured into ~1200 ml. of a mixture of ice and water, and a dilute solution of $H_2SO_4$ was added with stirring until the pH was in the range of 1–2. The cold solution was stirred for one hour and extracted with 500 ml. of ether, and then again with 100 ml. of ether. The ether layer was dried and the ether was evaporated off, leaving an oil which was purified by vacuum distillation at 177° under a pressure of about 35 mm. of mercury. The yield of colorless oil was 92.0 g. (89% of the theoretical amount).

To 125 ml. of methylene chloride as solvent was added 70 ml. of a 30% HBr solution (0.37 mole of HBr) in glacial acetic acid, and 29.2 g. of o-acetoxybenzyl acetate. The solution was allowed to stand 10–15 hours, and 70 ml. (0.68 mole( of acetic anhydride was added. After the mixture stood for another hour, the solvents were removed over a water bath under reduced pressure and the final product was vacuum distilled. o-Acetoxybenzyl bromide was obtained as a colorless oil boiling at 174–175° at 50 mm. of mercury pressure. The yield was 27.2 g. or 78% of the theoretical amount.

To 44.8 g. of the disodium salt of N,N'-ethylenediaminediacetic acid dissolved in 700 ml. of a solvent containing 70% ethanol and 30% water, 90 g. of o-acetoxybenzyl bromide was added. To this solution was slowly added 20 g. of sodium hydroxide in 50 ml. of water, with stirring, while the reaction mixture was heated to 35° and the pH was kept within the range of 8–10. After the completion of the addition of the base, the reaction mixture was heated to 60° for about an hour. Then an equal amount of the 30% sodium hydroxide solution was again added, with stirring, and the reaction mixture was maintained at 70° for two hours. To the reaction mixture was then added about 1400 ml. of water, and the resulting solution was evaporated at atmospheric pressure until its volume was about a liter. It was cooled, and the pH reduced to about 1.0 by the addition of cold, concentrated hydrochloric acid. The solution was filtered and allowed to stand several hours at 0°. About 50 g. of N,N'-bis(o-hydroxybenzyl)-N,N'-diacetic acid dihydrochloride was obtained as a finely-divided microcrystalline solid, which melted at 140° with decomposition.

EXAMPLE II

N,N-bis(o-hydroxybenzyl)glycine

A solution of 0.15 mole of sodium glycinate was dissolved in 500 ml. of 75% ethanol and treated with 90 g. of o-acetyoxybenzyl bromide, under reaction conditions essentially the same as described under Example I. Two successive additions of 20.0 g. of NaOH were made as 30% aqueous solutions, the first addition occurring at 35°, and the second at 70°. After a final heating at 70° for four hours, additional water was added and ethanol was removed by evaporation. The final product was obtained as an anhydrous crystalline solid after evaporation of the solution to 500 ml. and adjustment of the pH to 4–5. (Note that under these conditions the hydrochloride was not formed.) The yield was 65% of the theoretical amount.

EXAMPLE III

N,N''-di(o-hydroxybenzyl)diethylenetriamine-N,N',N''-triacetic acid trihydrochloride To 0.10 mole of the trisodium salt of N,N',N''-diethylenetriaminetriacetic acid in one liter of 80% ethanol was added 0.30 mole of o-acetoxybenzyl bromide while the temperature was maintained at 40° and the pH was maintained at 8–10 by the slow addition of 0.30 mole of NaOH as a 20% solution in 50% ethanol. The temperature was then raised to 80° for an hour, and an additional 0.30 mole of NaOH was then added slowly while the temperature was maintained at 80°. After completion of the addition of the second batch of NaOH, the solution was brought to 100° for an hour, the alcohol was evaporated off, the volume of the solution was adjusted to 1.0 liter, and the pH was reduced to 0–0.5 by the addition of concentrated hydrochloric acid. The solution was filtered and chilled at 0° for several hours. The trihydrochloride crystallized out as a fine colorless solid. The yield was 75% of the theoretical amount.

EXAMPLE IV

N,N'-bis(o-hydroxybenzyl)-N,N'-ethylenediaminediacetic acid dihydrochloride

To 50.0 g. of the disodium salt of N,N'-ethylenediaminediacetic acid dissolved in 750 ml. of a 70% alcohol-30% water solution, was added 80 g. of o-acetoxybenzyl chloride. The solution was gently refluxed while 40 g. of NaOH as a 20% aqueous solution was gradually added over a period of six hours. After evaporation of the alcohol and dilution to one liter, the final product was isolated as described in Example I. In this case a 70% yield was obtained.

EXAMPLE V

Monosodium salt of the Fe(III) chelate of N,N'-bis(o-hydroxyethyl)ethylenediaminediacetic acid A sample of the dihydrochloride of the chelating agent (0,010 mole) was shaken up with about 0.030 mole of $Ag_2O$ in 50% aqueous ethanol to remove chloride ion, and the filtered solution was then combined with 0.010 mole of NaOH and 0.010 mole of basic ferric acetate. The reaction mixture was warmed and filtered, and the deep wine-red solution obtained was allowed to evaporate slowly at room temperature. Some red-black crystals of the monosodium salt of the chelate were obtained on partial evaporation. Completion of the evaporation resulted in the isolation of the remaining product as a red-black solid. The yield was essentially quantitative.

EXAMPLE VI

The thorium chelate of N,N''-bis(o-hydroxybenzyl)-N,N',N''-diethylenetriaminetriacetic acid The pure acid form of the chelating agent is obtained as in example V by the removal of HCl with $Ag_2O$. After recrystallization from water, 0.010 mole of the product is combined with 0.010 mole of a suspension of freshly-precipitated thorium hydroxide. The thorium hydroxide usually dissolves with stirring within five minutes at room temperature, but sometimes gentle warming is necessary. The crystalline monoprotonated chelate is isolated by evaporation of the solution to a small volume and allowing it to stand in the cold. The yield of final product runs from 95–98% of the theoretical amount.

Other metal chelates of the three new ligands described above may be synthesized in one of two ways:

(1) The preferred method, which gives the metal chelate in high purity, is to combine the acid form of the ligand with the appropriate amount of the metal hydroxide, and with an alkali metal hydroxide, if needed. To be reactive, the metal hydroxide must be freshly precipitated, and not subjected to heat. For high purity of the product, the metal hydroxide must be separated from alkali metal salts, or other soluble salts. This may be done by washing the suspension with distilled water repeatedly by decantation, or with a centrifuge. The final produce is then crystallized from the filtered solution by evaporation of solvent.

(2) The second, more convenient, method yields the chelate mixed with an (inert) inorganic salt, such as sodium chloride. The method consists of bringing together equimolar amounts of a metal salt and the ligand. The latter may be the pure acid form or the hydrochloride, which requires the addition of base for complete formation of the chelate. If the sodium (or other alkali or ammonium) salt of the ligand is employed it is not necessary to add base to the reaction mixture. Islation of the product is accomplished by evaporation.

An example of this method would consist of combining one mole of the dihydrochloride salt of HBED with one mole of ferric chloride. Subsequent addition of six moles of NaOH, followed by evaporation, gives one mole of the sodium salt of the ferric chelate of HBED, mixed with 5 moles of sodium chloride. The latter may be separated from the metal chelate by fractional crystallization, or the metal chelate may be used directly with the sodium chloride present.

The products described in the above examples were identified and characterized by the use of various analytical techniques. In all cases elemental analysis gave results that were within the prescribed limits (within 0.3% for percent C, and within 0.2% for percent N).

The nature of the chelating agents and metal chelates was proved by infrared spectral determinations. The infrared spectra showed broad absorption bands in the carbonyl region, as expected, due to the stretching vibrations of the carboxyl carbonyl (in the hydrochlorides), of the carboxylate carbonyl (in the free ligand acid) and of the metal-coordinated carbonyl (in the metal chelates). In all cases, the C—O stretching vibration of the phenolic group, or of the coordinated phenolate ion, was clearly discernable. In the free ligands, the O—H stretch of the phenolic group was also observed in the infrared.

In the claims the positive and negative charges merely represent a kind of formalism which assists in distinguishing the constituents of the compounds from each other. They are not intended in any way to indicate structure or ionization of individual atoms or radicals.

What is claimed is:
1. The method of synthesizing compounds corresponding to general formula

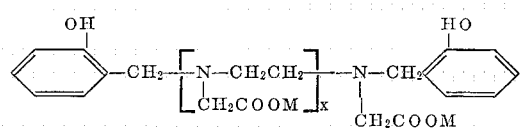

wherein:
$x = 0, 1, 2$
$M = H^+, Na^+, K^+, NH_4^+$
said method comprising the steps of
(1) reacting at elevated temperatures, an orthohydroxybenzyl alcohol with an esterifying agent selected from the group consisting of low molecular weight fatty acids and anhydrides;
(2) halogenating the resulting ester compound by reacting said ester with a hydrogen halide solution;
(3) reacting the resulting ortho-acyloxybenzyl halide with an amino acetic acid compound in the presence of an alkaline reagent to condense the amino hydrogen with said halide group and, thereafter, to remove the esterifying acid from the esterified phenolic group; and,
(4) recovering the product corresponding to the formula.

References Cited
UNITED STATES PATENTS

| | | | |
|---|---|---|---|
| 2,717,263 | 9/1955 | McKinney et al. | 260—471 |
| 2,794,818 | 6/1957 | Bersworth | 260—438 |
| 2,967,196 | 1/1961 | Kroll et al. | 260—507 |
| 3,038,793 | 6/1962 | Kroll et al. | 71—1 |

OTHER REFERENCES

L'Eplattenier et al., J. Am. Chem. Soc. vol. 89 (1967), pp. 837–843.

Finar, Organic Chemistry, vol. 1, Longman's, Green and Co. Ltd., London, (1963), pp. 322, 324.

TOBIAS E. LEVOW, Primary Examiner

A. P. DEMERS, Assistant Examiner

U.S. Cl. X.R.

260—429, 429.1, 429.3, 429.7, 438.1, 444